| United States Patent [19] | [11] Patent Number: 4,707,500 |
| Hinnenkamp et al. | [45] Date of Patent: Nov. 17, 1987 |

[54] SYNTHETIC CRYSTALLINE FERROBOROSILICATE COMPOSITIONS, THE PREPARATION THEREOF AND THEIR USE IN THE CONVERSION OF SYNTHESIS GAS TO LOW MOLECULAR WEIGHT HYDROCARBONS

[75] Inventors: James A. Hinnenkamp; Vernon V. Walatka, both of Cincinnati, Ohio

[73] Assignee: National Distillers and Chemical Corporation, New York, N.Y.

[21] Appl. No.: 947,132

[22] Filed: Dec. 29, 1986

Related U.S. Application Data

[63] Continuation of Ser. No. 751,168, Jul. 2, 1985, abandoned, which is a continuation-in-part of Ser. No. 256,308, Apr. 22, 1981, abandoned, which is a continuation-in-part of Ser. No. 92,127, Nov. 7, 1979, Pat. No. 4,331,641.

[51] Int. Cl.$^4$ .............................................. C07C 1/04
[52] U.S. Cl. .................................. 518/713; 518/714; 518/721; 585/408; 585/469; 585/733; 585/700

[58] Field of Search ................ 518/713, 714, 719, 721

[56] References Cited

U.S. PATENT DOCUMENTS 4,208,305 6/1980 Kouwenhuven et al. .
4,269,813 5/1981 Klotz .

*Primary Examiner*—Howard T. Mars
*Attorney, Agent, or Firm*—K. D. Tremain

[57] ABSTRACT

Crystalline ferroborosilicate compositions are prepared from a silica containing mixture by digesting a reaction mixture comprising a tetraalkylammonium compound, a sodium hydroxide, a boron compound, an oxide of silicon, an iron ion source, an optional chelating agent and water to provide the crystalline ferroborosilicate which is then palladium ion-exchanged. This composition may be used alone or physically mixed with a methanol catalyst. Conversion of synthesis gas, dimethylether, ethylene and methanol to low molecular hydrocarbons employing these new ferroborosilicates as catalysts is also disclosed.

10 Claims, No Drawings

SYNTHETIC CRYSTALLINE FERROBOROSILICATE COMPOSITIONS, THE PREPARATION THEREOF AND THEIR USE IN THE CONVERSION OF SYNTHESIS GAS TO LOW MOLECULAR WEIGHT HYDROCARBONS

CROSS-REFERENCE TO RELATED APPLICATIONS

This application is a continuation of copending application Ser. No. 751,168, filed on July 2, 1985, now abandoned, which is a continuation-in-part of application Ser. No. 256,308 filed April 22, 1981 now abandoned which is a continuation-in-part of application Ser. No. 092,127, filed Nov. 7, 1979, now U.S. Pat. No. 4,331,641.

BACKGROUND OF THE INVENTION

1. Field of the Invention

The present invention relates to new crystalline silicate compositions. Further, this invention relates to methods for producing these new crystalline metallosilicate compositions and to a method for the catalytic conversion of synthesis gas to low molecular weight hydrocarbons utilizing these compositions.

2. Discussion of the Prior Art

Zeolite materials, both natural and synthetic, are known to have catalytic capability for various types of reactions, especially hydrocarbon conversions. The well known crystalline aluminosilicate zeolites are commonly referred to as "molecular sieves" and are characterized by their highly ordered crystalline structure and uniformly dimensioned pores, and are distinguishable from each other on the basis of composition, crystal structure, adsorption properties and the like. The term "molecular sieves" is derived from the ability of the zeolite materials to selectively adsorb molecules on the basis of their size and form.

The processes for producing such crystalline synthetic zeolites are well known in the art. A family of crystalline aluminosilicate zeolites, designated ZSM-5, is disclosed in U.S. Pat. No. 3,702,886, said patent being herein incorporated by reference.

U.S. Pat. No. 3,941,871 relates to novel crystalline metal organosilicates which are essentially free of Group IIIA metals, i.e., aluminum and/or gallium. This patent is herein incorporated by reference. It is noted therein that the amount of alumina present in the known zeolites appears directly related to the acidity characteristics of the resultant product and that a low alumina content has been recognized as being advantageous in attaining a low degree of acidity which in many catalytic reactions is translated into low coke making properties and low aging rates. A typical procedure for making the organosilicates is to react a mixture containing a tetraaklylammonium compound, sodium hydroxide, an oxide of a metal other than a metal of Group IIIA, an oxide of silicon, and water until crystals of said metal organosilicates are formed. It is also noted in the patent that the family of crystalline metal organosilicates have a definite X-ray diffraction pattern which is similar to that for the ZSM-5 zeolites. Minor amounts of alumina are contemplated in the patent and are attributable primarily to the presence of aluminum impurities in the reactants and/or equipment employed.

U.S. Pat. No. 3,884,835 discloses crystalline silica compositions. The crystalline silica materials may also contain a metal promoter which may be selected from Group IIIA, Group VB or Group VIB elements. Boron is disclosed as one of the metal promoters.

U.S. Pat. No. 4,088,605 is directed to the synthesis of a zeolite, such as ZSM-5, which contains an outer shell free from aluminum. The patent states at column 10, the paragraph beginning at line 20, that to produce the outer aluminum-free shell, it is also essential that the reactive aluminum be removed from the reaction mixture. It is therefore necessary, as noted therein, to process the zeolite and to replace the crystallization medium with an aluminum-free mixture to obtain crystallization of $SiO_2$ on the surface of the zeolite which can be accomplished by a total replacement of the reaction mixture or by complexing from the original reaction mixture any remaining aluminum ion with reagents such as gluconic acid or ethylenediaminotetraacetic acid (EDTA).

Crystalline borosilicate compositions are disclosed in German Offenlegungschrift No. 2,746,790. This application relates specifically to borosilicates which are prepared using the usual procedures for making the aluminosilicate zeolites. It is noted therein that in instances where a deliberate effort is made to eliminate aluminum from the borosilicate crystal structure because of its adverse influence on particular conversion processes, the molar ratios of $SiO_2/Al_2O_3$ can easily exceed 2000–3000 and that this ratio is generally only limited by the availability of aluminum-free raw materials.

German Offenlegungschrift No. 2,755,770 (corresponding to British Pat. No. 1,555,928), discloses the preparation of crystalline iron silicates with and without added aluminum, and discloses their use as catalysts for the conversion of methanol to hydrocarbons at high aromatic selectivity. It is further claimed that promoters such as boron can be added to these iron silicates, but no examples of such are given.

U.S. Pat. No. 4,468,474 discloses hydrogen activated catalyst compositions comprising iron, silicon and carbon that selectively convert gaseous mixtures to $C_2$–$C_6$ alkenes. It is further noted that the catalysts maintained their activity and high selectivity over a long period and that regeneration of partially deactivated catalysts can be accomplished by treatment with hydrogen at elevated temperature.

U.S. Pat. No. 4,298,695 discloses the conversion of synthesis gas to a liquid hydrocarbon, e.g. naphtha. The process does not employ catalysts which need promoters and high activity without aging is characteristic.

U.S. Pat. No. 4,418,155 discloses a process for the conversion of synthesis gas utilizing a catalyst which comprises a ZSM-5 type zeolite and a carbon oxide reducing component. This process yields a particular product, e.g., linear alpha-olefins, ($C_4$–$C_6$ olefins).

While the art has provided zeolitic composition having a wide variety of catalytic and adsorbtive properties, the need still exists for crystalline materials having different and/or enhanced catalytic properties. For example, an important use for a catalytic material is the conversion of synthesis gas to low molecular weight hydrocarbons. Further, many hydrocarbon conversion processes are performed employing zeolites, e.g., alkylation and isomerization. As is well-known in the art, it is important to maximize selectivity for a desired product.

Accordingly, it is one object of the present invention to provide novel crystalline borosilicate compositions.

Another object of this invention is to provide novel crystalline ferroborosilicate compositions having different and enhanced catalytic properties.

A further object of the invention herein is to provide a new method in the preparation of these novel crystalline ferroborosilicate compositions.

A still further object of this invention is to provide an improved method for the conversion of hydrocarbons and oxygenated compounds to selected end products.

Still another object of this invention is to provide an improved method for the conversion of synthesis gas to low molecular weight hydrocarbons utilizing ferroborosilicate compositions.

The achievement of these and other objects will be apparent from the following description of the subject invention.

SUMMARY OF THE INVENTION

These and other objects are achieved by incorporating palladium or platinum into ferroborosilicates of the present invention. Briefly, this invention relates to novel palladium or platinum ferroborosilicate compositions, the preparation of these compositions and the use of these compositions to convert synthesis gas to low molecular weight hydrocarbons, preferably ethane. Consequently, when compositions prepared in accordance with present invention are used in the conversion of synthesis gas to low molecular weight hydrocarbons, the compositions exhibit high catalytic activity in the conversion of synthesis gas to $C_2$-$C_4$ alkanes, with high selectivity specifically for ethane. These properties are contrary to the results expected from this type of crystalline zeolite composition.

In particular, this invention relates to compositions which are represented in terms of the mole ratio as follows: (0.2 to 15) $M_{2/m}O$: (0.2 to 10) $Z_2O_3$: (5 to 1000) $SiO_2$: $Fe_{2/n}O$: (0 to 2000) $H_2O$
wherein M comprises a cation of a quaternary ammonium, metal, ammonium, hydrogen and mixtures thereof, m is a valence of said cation, n is the valence of the iron cation, and $Z_2O_3$ is a metal oxide, e.g., comprising at least boron. These compositions are further described by the following additional steps:
wherein said composition has palladium or platinum incorporated therein; and
wherein the composition is substantially sodium free.

In another embodiment, the compositions of this invention are prepared by a method which comprises:

(a) heating a reaction mixture capable of forming a crystalline product under conditions effective to provide crystalline product, said reaction mixture comprising a quaternary ammonium compound, a source of a boron oxide, an oxide of silicon, an alkali metal hydroxide, a source of iron oxide, and water, and (b) recovering the crystalline product.

In yet another embodiment, this invention relates to ferroborosilicate compositions that are prepared by the method described above.

Still another embodiment of this invention relates to a method for the conversion of synthesis gas comprising
contacting synthesis gas which comprises hydrogen and carbon monoxide with a catalytically effective amount of the silicate compositions describe above under conversion effective to provide ethane at a carbon selectivity of at least 40%.

DETAILED DESCRIPTION OF THE INVENTION

Thus, in accordance with the present invention, there are provided crystalline ferroborosilicates which can be identified in terms of the mole ratios of oxides as follows: (0.2 to 15) $M_{2/m}O$: (0.2 to 10) $Z_2O_3$: (5 to 1000) $SiO_2$: $Fe_{2/n}O$: (0 to 2000) $H_2O$
wherein M is a cation, m is the valence of the cation, n is the valence of the iron cation and $Z_2O_3$ is a metal oxide (e.g., boron oxide). The $Z_2O_3$ component can include other metal oxides in addition to those oxides noted above. Moreover, for the purposes of this invention, while boron is not a metal per se, its oxide is considered a metal oxide as defined herein. In the preferred form, Z is boron and M is selected from the group consisting of alkali metal, preferably sodium, tetraalkylammonium, preferably tetrapropylammonium, phosphonium cations having alkyl groups containing up to 6 carbon atoms, and preferably 2 to 5 carbon atoms and mixtures thereof.

Copending U.S. patent application Ser. No. 256,308 filed April 22, 1981, incorporated herein by reference, discloses a new class of crystalline ferroborosilicate compositions. Like the crystalline borosilicates of U.S. Pat. No. 4,331,641, these compositions are prepared by a process which requires that the amount of aluminum in the reaction mixture be carefully controlled and further that a chelating agent be present in the reaction mixture.

The ferroborosilicates of this invention can be prepared by heating a reaction mixture comprising a quaternary ammonium compound e.g. a tetraalkyl (such as tetrapropyl) ammonium bromide or hydroxide, an alkali metal source, e.g., sodium hydroxide or sodium chloride, a metal, e.g., boron, as the source of the metal oxide, a metal compound as the source of the metal oxide, an oxide of silicon, a source of ferrous and/or ferric ion, such as a ferrous and/or a ferric salt, e.g., $FeCl_2 \cdot 4H_2O$, $FeCl_3 \cdot 6H_2O$, mixtures thereof and the like, an optional chelating agent, e.g., 8-hydroxyquinoline-5-sulfonic acid (8HQS) and water, usually having the composition in terms of mole ratios falling within the following ranges:

|  | Broad | Preferred |
| --- | --- | --- |
| $OH^-/SiO_2$ | 0.05–3 | 0.20–0.90 |
| $R_4N^+/(R_4N^+ + Na^+)$ | 0.01–1 | 0.03–0.9 |
| $H_2O/OH^-$ | 10–800 | 20–500 |
| $SiO_2/Z_2O_3$ | 2–1000 | 12–500 |
| $SiO_2$/chelating agent | >1 | >20 |
| $SiO_2/Fe_{2/n}O$ | 10–10,000 | 40–4000 | and maintaining the mixture at elevated temperatures for a time sufficient to form crystals of the product. Typical reaction conditions consist of heating the reaction mixture at elevated temperature, e.g., 50° to about 250° C., and even higher, for a period of time of from about 6 hours to as much as 60 days. The preferred temperature is from about 100° to 190° C., for time periods of from about 1 to about 16 days. The reaction mixture can be heated at elevated pressure as in an autoclave, or at normal pressure, e.g., as by refluxing. The preferred method of heating the reaction mixture is at reflux temperature.

As in common practice in the production of silicate compositions, when reflux heating of the reaction mixture is employed, large amounts of sodium chloride along with some sulfuric acid are added to the reaction mixture to ensure crystallization of the product. Thus, in reflux preparation, the ratios of $SiO_2/Z_2O_3$, $OH^-/SiO_2$, $SiO_2/Fe_{2/n}O$ and the like ratios may result in values different from the ratios of the autoclave processing.

The digestion of the gel particles is carried out until crystals form. The solid product is separated from the reaction medium as by cooling the whole to room temperature, filtering, and water washing.

The foregoing product is dried, e.g., at 110° C. for from about 8 to 24 hours or longer. Of course, milder conditions may be employed if desired, e.g., room temperature under vacuum.

The sodium content of these compositions must be minimized in order to obtain an active composition for the conversion of synthesis gas to low molecular weight hydrocarbons. Sodium contamination can be substantially avoided by ion-exchanging ammonium into the sodium ferroborosilicate composition prior to palladium ion-exchange. Sodium content in the ferroborosilicate composition in the range of about 0.2 to about 1.0 wt. % renders the composition inactive for the conversion of synthesis gas to low molecular hydrocarbons. However, subsequent to ammonium exchange, an active composition is obtained when the sodium content is in the range of about 0 to about 0.1, preferably in the range of about 0 to about 0.05 wt. %.

Subsequent to reducing the sodium content, the composition is palladium or platinum exchanged and heat treated in air at 540° C. for 4 hours and cooled to ambient temperature. Palladium is preferred and the invention will be described herein utilizing palladium although those skilled in the art will appreciate that platinum may be employed where its use is advantageous. The composition is then subjected to a hydrogen treatment during which the treating temperature is increased from ambient conditions to about 200° C. to about 500° C., preferably about 300° C. to about 400° C. The rate of temperature increase must be controlled. A temperature increase of about 0.1° C. to about 5° C. per minute, preferably 0.5° C. to about 2.0° C. per minute, must be employed. After reaching the desired temperature, the composition is maintained at this temperature for about 0.5 to about 4 hours, preferably about 0.75 hour to about 1.25 hour. The composition is then cooled to ambient temperature in the presence of an inert gas, or hydrogen. The treatment of the composition with hydrogen during the heat treatment and cooling steps increases the ethane selectivity when the composition is employed in the conversion of synthesis gas to low molecular weight hydrocarbons.

The ferroborosilicate compositions of the present invention can be extracted with a strong mineral acid to further increase ethane selectivity prior to palladium exchange. This extraction with a strong mineral acid is believed to remove non-lattice or amorphous iron that is detrimental to ethane selectivity. Any strong mineral acid can be used for this extraction procedure, such as, for example, hydrochloric acid, sulfuric acid, nitric acid or the like. The strong mineral acids should have a concentration in the range of about 0.1 molarity up to and including the concentrated form of the acid. The extraction treatment should take place prior to palladium exchange for at least 1 hour to about 48 hours at a temperature in the range of about 0° C. to about 100° C., preferably about 60° C.

Further, ethane selectivity of the composition will vary with the amount of iron present in the lattice structure. For example, high ethane selectivity is obtained at 0.1-2.0% iron. In the preferred form, the composition has a higher ethane selectivity and better stability when iron is present in the lattice structure in the range of about 0.3% wt to about 0.8% wt.

In an optional embodiment of this invention, the physical mixing of commercially available methanol synthesis catalysts, such as, for example, a copper oxide-zinc oxide or a chromium oxide-zinc oxide catalyst, with the palladium ferroborosilicate increases the catalytic conversion of synthesis gas to alkanes. The copper-zinc catalyst, available from United Catalyst Inc. under the designation "C18HC", has high activity due to its composition of a 1:1 ratio of ZnO to CuO plus 10% alumina. The chromium-zinc catalyst, available from Harshaw Chemical Co. under the designation "Zn-0312 T", is composed of 74% ZnO, 21% chromium oxide and 600 parts per million of aluminum. Higher yields result when the methanol synthesis catalyst is added in a weight ratio of about 0.1 to 10, preferably about 0.3 to 5, in relation to the amount of palladium ferroborosilicate.

The methanol synthesis catalyst may be physically mixed with the palladium ferroborosilicate composition by any known method, such as, for example, blending, ultrasonic mixing and the like.

As noted hereinabove, and as known in the art, the procedure for preparing zeolites, e.g., aluminosilicates, is well known. It is an optional feature of the present invention, however, that the crystalline composition may be prepared using a reaction mixture containing a chelating agent, such as 8-hydroxyquinoline-5-sulfonic acid, in a molar ratio of $SiO_2$/chelating agent of greater than 1, preferably greater than 20.

Moreover, it is essential herein that the chelating agent employed in the preparation yields a crystalline product. It has been observed, for example, that the ethylenediaminetetraacetic acid (EDTA) and hydroxyethylenediaminotriacetic acid (HEEDTA) yield only amorphous materials. Thus, while 8-hydroxyquinoline-5-sulfonic acid is a preferred chelating agent for the preparation of the crystalline iron-borsilicates of this invention, other chelating agents which provide crystalline materials are also contemplated to be within the scope of this invention.

The present invention provides crystalline palladium ferroborosilicate compositions which exhibit superior catalytic activity for the highly selective conversion of mixtures of synthesis gas (carbon monoxide and hydrogen) to low molecular weight hydrocarbons ($C_2$–$C_4$ alkanes). Moreover, the compositions of the present invention maintain their catalytic activity and high selectivity over relatively long periods of time.

Synthesis gas is provided commercially by such well known processes as the steam reforming of naphtha or natural gas or the partial oxidation of carbonaceous materials, such as coal or heavy petroleum distillates. The reactions involved are:

Stream Reforming:

$$C_nH_{(2n+2)} + nH_2O \rightarrow nCO + (2n+1)H_2$$

Partial Oxidation:

$$4C + 2H_2O + O_2 \rightarrow 2H_2 + 4CO$$

or

$$C_nH_{(2n+2)} + (n/2)O_2 \rightarrow nCO + (n+1)H_2$$

The high activity exhibited by the palladium exchanged silicates of this invention for the conversion of synthesis gas to low molecular weight hydrocarbons, especially ethane, is particularly surprising in view of the inactivity of ferroborosilicate compositions that have not been palladium ion-exchanged. Further, the selectivity for ethane in the conversion of synthesis gas to low molecular hydrocarbons is unexpected since iron based catalyst are known to possess Fisher-Tropsch activity, e.g., convert synthesis gas to methane or $C_{5+}$ hydrocarbons.

The processes for conversion of mixtures of gaseous carbon monoxide and hydrogen in the presence of an effective amount of the compositions of the present invention is conveniently conducted at a temperature in the range of about 250° to about 500° C., normally 325° -500° C., a pressure in the range of about 0 psig (101 kPa) to about 1500 psig (10,442 kPa), preferably 50 psig (446 kPa) to 1000 psig (6995 kPa) in a batch or flow reactor system. The volume ratio of carbon monoxide to hydrogen is conveniently in the range of about 0.2 to about 6, normally about 0.5 to about 2.

The process of the present invention is conducted for a time sufficient to form a product mixture, containing methane, $C_2$-$C_6$ alkenes and alkanes, carbon dioxide, water and less than 5.0% alcohols and ethers. The product mixture may be entrapped in a suitable trapping means such as a condenser and thereafter separated by standard techniques, e.g., distillation. For example, when utilizing the subject process in a batch-wise fashion, contact times of about 0.1 to about 30, preferably about 0.5 to about 2 minutes are found to be effective. When reacting the subject process continuously, space velocities of about 0.1 to about 20, preferably about 0.5 to about 10 weight hourly space velocity (WHSV) should be utilized.

The activity of the compositions of the present invention is achieved at temperatures of about 325° to 500° C. Furthermore, the composition deactivates rapidly at temperatures of about 450° C. to about 500° C. The activity of the composition is decreased at temperatures of about 300° C. to about 325° C. Temperatures in the range of about 325° C. to about 425° C. are preferred for maximizing catalytic activity, service lifetime and selectivity to ethane.

The process of the present invention can be operated in batch or continuous mode. A continuous flow reactor minimizes secondary reactions of initially formed products and extends the service lifetime of the composition.

It is not known why the crystalline compositions of this invention provide such unexpected properties as high activity for the conversion of synthesis gas to low molecular weight hydrocarbons and the high selectivity for ethane. Crystalline compositions that do not contain both iron and palladium do not inherently exhibit these properties and cannot be activated to provide a crystalline composition having the selectivity described herein. It is believed that the inability of the ferroborosilicates which do not contain palladium to catalyze synthesis gas conversion is because the iron is part of the lattice structure and is not readily reduced to the synthesis gas active metal as is the case with amorphous iron catalysts.

In preparing the crystalline compositions of this invention, the silica source can be any of those commonly considered for use in synthesizing zeolites such as powdered silicic acid, colloidal silica or dissolved silica. A preferred silica source is Cab-O-Sil, sold by Cabot Co.

The source of iron oxide may be ferrous salts or ferric salts such as $FeCl_2.4H_2O$, $FeCl_3.6H_2O$ and the like as well as mixtures of such salts.

The specific crystalline compositions of this invention described, when evaluated for catalytic properties without having been calcined, are inactive, possibly because the intracrystalline free space is occupied by organic cations from the forming solution. They may, however, be activated by heat treatment using known techniques such as heating in an inert atmosphere or air at 200°-900° C., for 1 to 60 hours. This may be followed by ion-exchange with ammonium salts and further heat treatment at 200°-900° C.

Typical ion-exchange techniques include contacting the members of the family of ferroborosilicates with a salt solution of the desired replacing cation or cations. Although a wide variety of salts can be employed, particular preference is given to chlorides, nitrates and sulfates.

Representative ion-exchange techniques are disclosed in a wide variety of patents including U.S. Pat. Nos. 3,140,249, 3,140,251 and 3,140,253, which are incorporated herein by reference.

Alternately, the ferroborosilicate may be impregnated with palladium or platinum ions by the addition of an ammonia or aqueous solution of an appropriate palladium or platinum salt. The ammonia solvent which is used may be liquid ammonia or aqueous ammonia containing greater than 50% weight percent ammonia. Prior to impregnation with either solution, the ferroborosilicate should, if necessary, be calcined at about 300° C. to about 600° C. for at least 4 hours in an inert atmosphere to drive off any organic cations which remain after formation of the ferroborosilicate and which would tend to block the pore structure of the ferroborosilicate.

Addition of the ammonia solvent dissolves the palladium or platinum salt and the resulting solution then permeates the ferroborosilicate to impregnate the ferrometallosilicate with palladium or platinum. After impregnation, the ferroborosilicate is dried, generally under mild conditions, to drive off the solvent and fix the palladium or platinum on the ferroborosilicate. Temperatures of up to about 200° C., preferably about 110° C. to about 130° C. are suitable for this purpose.

The percent by weight of palladium or platinum that is ion-exchanged or impregnated significantly affects the catalytic activity and selectivity for ethane in the conversion of synthesis gas. The lower the percent by weight of palladium or platinum present in the ferroborosilicate, generally the lower the catalytic activity for the conversion of synthesis gas to $C_2$-$C_4$ alkanes and a corresponding lower selectivity for ethane. 0 The percent by weight of platinum or palladium present on the ferroborosilicate should be about 0.1% weight to about 10% weight, with about 0.2% weight to about 5.0% weight being preferred. The borosilicate must have at least 0.1% weight of palladium or platinum present in the composition in order to obtain good selectivity and stability for the conversion of synthesis gas to $C_2$-$C_4$ alkanes.

Various metals may be ion-exchanged or alternatively impregnated on the ferroborosilicates in accordance with this invention. Group·VIII metals are intended to be included in the scope of this invention, with palladium or platinum being preferred, and palladium being specifically preferred.

Following contact with the salt solutions of the desired replacing cation, the crystalline compositions are then preferably washed with water and dried at a temperature up to about 200° C. and thereafter heat treated as previously described.

Regardless of the cations replacing the sodium in the synthesized form of the compositions, the spatial arrangement of the atoms which form the basic crystal lattices in any given composition of this invention remain essentially unchanged by the described replacement of sodium or other alkali metal as determined by taking an X-ray powder diffraction pattern of the ion-exchanged material.

The compositions prepared by the instant invention are formed in a wide variety of particular sizes. Generally speaking, the particles can be in the form of a powder, a granule, or a molded product, such as extrudate having a particle size sufficient to pass through a 2 mesh (Tyler) screen and be retained on a 100 mesh (Tyler) screen. In cases where the composition is molded, such by extrusion, the composition can be extruded before drying or dried or partially dried and then extruded.

In the case of mixtures of methanol synthesis catalyst and palladium ferroborosilicate, the mixing can occur before or after the extrusion process. It should be remembered that when the methanol synthesis catalyst is present before heat treatment, the treating should be chosen so as not to adversely affect the methanol synthesis catalyst.

In the case of many catalysts, it is desired to incorporate the composition of this invention with another material resistant to the temperatures and other conditions employed in organic conversion processes. Such materials include active and inactive materials and synthetic or naturally occurring crystalline compositions as well as inorganic materials such as clays, silica and/or metal oxides. The latter may be either naturally occurring or in the form of gelatinous precipitates or gels including mixtures of silica and metal oxides. Use of a material in conjunction with the present composition tends to improve the conversion and/or selectivity of the catalyst in certain organic conversion processes. Inactive materials suitably serve as diluents to control the amount of conversion in a given process so that products can be obtained economically and in an orderly manner without employing other means for controlling the rate of reaction. Normally, zeolite materials have been incorporated into naturally occurring clays, e.g., bentonite and kaolin, to improve the crush strength of the composition under commercial operating conditions. These materials, e.g., clays, oxides, etc. function as binders for the composition. It is desirable to provide a composition having good crush strength, because in a chemical process the composition is often subjected to handling or use which tends to break the composition down into powder-like materials which cause problems in processing. These clay binders have been employed for the purpose of improving the crush strength of the composition.

In addition to the foregoing materials, the composition can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel.

The following examples are presented as specific embodiments of the present invention and show some of the unique characteristics of the claimed crystalline compositions and are not to be considered as constituting a limitation on the present invention.

EXAMPLE 1

This example demonstrates a preparation of a member of the novel crystalline ferroborosilicates ($SiO_2$/$B_2O_3$/$FeO_x$-8HQS) of the present invention.

80.0 g of fumed silica (Cab-O-Sil), 55.0 g of 50% NaOH and 800 ml water were combined. The solution was poured into a 2000 ml polypropylene flask which was placed in an oil bath at 120° C. for 24 hours. A reflux condenser was attached to the flask.

A second solution was prepared containing 85.0 g NaCl, 33.0 g tetrapropylammonium bromide, 8.9 g boric acid, 19.0 g of concentrated sulfuric acid and 350 ml water.

With both solutions at room temperature, the second solution was slowly added to the sodium silicate with mixing.

A third solution containing 8.5 g of 50% NaOH, 13.0 g of 8-hydroxyquinoline-5-sulfonic acid (8HQS), 300 ml water and 6.0 g of $FeCl_3.6H_2O$ was prepared and added to the above.

The pH was 9.1 and was adjusted to 8.5 with $H_2SO_4$ Total weight of mixture=1791.3 g.

The slurry was placed in a 2000 ml polypropylene flask (reflux condenser attached) and partially immersed in an oil bath at 120° C. for 15 days, after which the flask was removed and cooled. The pH=10.1 and the weight loss due to evaporation was 25 g. The solid was collected on a filter, washed and dried at 120° C. for 24 hours yielding 86.6 g of the $Na^+$ form of the ferroborosilicate.

Fe=1.2%, B=0.27%, Al=17 ppm.

The following X-ray diffraction pattern of the product was obtained:

TABLE 1

| Interplanar Spacing d(A) | Relative Intensity |
|---|---|
| 11.2 | M |
| 10.0 | W |
| 9.71 | VW |
| 9.02 | VW |
| 7.49 | VW |
| 7.08 | VW |
| 6.70 | VW |
| 6.37 | VW |
| 6.02 | VW |
| 5.75 | VW |
| 5.61 | VW |
| 5.15 | VW |
| 5.01 | VW |
| 4.62 | VW |
| 4.37 | VW |
| 4.27 | VW |
| 4.00 | VW |
| 3.85 | VS |
| 3.72 | MS |
| 3.67 | M |
| 3.45 | W |
| 3.32 | W |
| 3.25 | VW |
| 3.06 | W |
| 2.98 | W |
| 2.94 | VW |
| 2.86 | VW |
| 2.78 | VW |
| 2.73 | VW |

TABLE 1-continued

| Interplanar Spacing d(A) | Relative Intensity |
|---|---|
| 2.60 | VW |
| 2.56 | VW |
| 2.51 | VW |
| 2.48 | VW |
| 2.40 | VW |
| 2.39 | VW |
| 2.00 | W |
| 1.96 | VW |
| 1.91 | VW |
| 1.87 | VW |
| 1.66 | VW |
| 1.49 | VW |

These values were determined by standard techniques. The radiation was the K-alpha doublet of copper, and a scintillation counter spectrometer with a strip chart pen recorder was used. The peak heights, I, and the positions as a function of $2\theta$ where $\theta$ is the Bragg angle, were read from the spectrometer chart. From these, the relative intensities $100\ I/I_o$ where $I_o$ is the intensity of the strongest line or peak, and d(obs.), the interplanar spacing in A. corresponding to the recorded lines, were calculated. In Table 1 the relative intensities are given in terms of the symbols VW=very weak (less than 10), W=weak (10-19), M=medium (20-39), MS=medium strong (40-70) and VS=very strong (greater than 70).

35.77 g of the dried material was calcined at 538° C. for 16 hours. After calcination, the weight was 31.39 g. A solution of 60 g NH$_4$Cl in 300 ml of water was refluxed with the solid for 3 hours. After washing the solid, the exchange was repeated a second time for 16 hours. After washing and drying, the NH$_4^+$ form of the composition was obtained. The composition was converted to the H$^+$ form by heating at 500° C. in flowing air.

EXAMPLE 2

A ferroborosilicate prepared in a manner similar to Example 1 was evaluated as a catalyst for the conversion of methanol, dimethylether and ethylene.

The iron silicate catalyst of German Offenlegungschrift No. 2,755,770, Exp. 6, page 53 (corresponding to British No. 1,555,928, Exp. 6, page 14), which is prepared by a method similar to Example 1, but without either boron or a chelating agent, is compared with a catalyst according to the present invention. The reaction conditions and resultant data for the conversion of methanol to hydrocarbons are summarized in Table II.

TABLE II

COMPARISON OF CATALYTIC DATA FOR METHANOL REACTION

| Temperature: | 350° C. | |
|---|---|---|
| Pressure (psig): | 75 | |
| Feed: | 1.5 g CH$_3$OH/g catalyst/hour | |
| Catalyst Form: | H$^+$ | |

| | SiO$_2$/FeO$_x$* | SiO$_2$/B$_2$O$_3$/FeO$_x$(8HQS)** |
|---|---|---|
| Catalyst | | |
| % HC Yield (C) | 66 | 64% C$_4-$ = 32 |
| % HC Sel. (C) | 40 | 84% C$_{5-10}$ = 52 |
| Aliphatics | | |
| Aromatics | 60 | 16 |
| % Aromatic Selectivity | | |
| C$_6$ | 0 | 1 |
| C$_7$ | 5 | 8 |
| C$_8$ | 16 | 25 |
| C$_9$ | 25 | 29 |
| C$_{10}$ | 54 | 37 |

*Silicate No. 8 German Offen. 2,755,770 Exp. 6 pg. 53 British Patent 1,555,928 Exp. 6 pg 14
**Prepared and activated similarly to the material of Example 1 above.

It is observed that the catalyst of the present invention produces substantially more aliphatic hydrocarbons compared to the prior art catalyst. Aromatic selectivity shows the present catalyst produces more of the lower molecular weight aromatics which is especially attractive from a commercial viewpoint.

The conditions for the dimethylether conversion reaction and the resultant data are shown in Table III below.

TABLE III

COMPARISON OF CATALYTIC DATA FOR DIMETHYL ETHER REACTION

| Temperature: | 500° C. | |
|---|---|---|
| Pressure (psig): | 6 | |
| Feed: | 1.5 g CH$_3$OCH$_3$/g catalyst/hour | |
| Catalyst Form: | H$^+$ | |

| | Prior Art Type SiO$_2$/FeO$_x$ | SiO$_2$/B$_2$O$_3$/FeO$_x$(8HQS) |
|---|---|---|
| Catalyst | | |
| % HC Yield (C) | 99 | 99 |
| % HC Sel. (C) | | |
| C$_1$ | 5 | 9 |
| C$_2$ | 8 | 6 |
| C$_3$ | 16 | 10 |
| C$_4$ | 19 | 25 |
| C$_{5+}$ | 14 | 38 |
| Aromatic | 38 | 12 |
| % Aromatic Selectivity | | |
| C$_6$ | 2 | 1 |
| C$_7$ | 14 | 10 |
| C$_8$ | 45 | 44 |
| C$_9$ | 30 | 36 |
| C$_{10}$ | 9 | 9 |

The catalyst of this invention yields more aliphatics than the prior art type catalyst. The above results for the prior art type catalyst are consistent with the high aromatics reported from methanol in the heretofore noted prior art patents.

The conditions for the ethylene conversion reaction and the resultant data are shown in Table IV below.

TABLE IV

Comparison of Catalytic Data for Ethylene Reaction

| Temperature: | 420° C. | |
|---|---|---|
| Pressure (psig): | 6 | |
| Feed: | 1.5 g C$_2$H$_4$/g catalyst/hour | |
| Catalyst Form: | H$^+$ | |

| | Prior Art Type SiO$_2$/FeO$_x$ | SiO$_2$/B$_2$O$_3$/FeO$_x$(8HQS) |
|---|---|---|
| Catalyst | | |
| % HC Yield (C) | 26 | 9 |
| % HC Sel. (C) | | |
| C$_1$ | 0 | 0 |
| C$_2$ | 7 | 14 |
| C$_3$ | 0 | 0 |
| C$_4$ | 3 | 86 |
| C$_{5+}$ | 90 | 0 |
| Aromatic | 0 | 0 |

The catalyst of this invention produces a greater selectivity to $C_4$ hydrocarbons (ethylene dimers) than the prior art type catalyst.

EXAMPLE 3

This example demonstrates the desirability for employing a chelating agent in the preparation of the crystalline ferroborosilicate compositions of the present invention.

Ferroborosilicate compositions are prepared as in Example 1 above except no 8HQS was added. The preparation was tried six times, resulting in two crystalline compositions (I and II) and four amorphous catalysts. Test data for the two crystalline compositions and one of the amorphous catalysts (III) are given below in Table V. All the compositions were tested in the H+ form at 6 psig and a feed rate of 1.5 g dimethylether (DME)/g catalyst/hour.

TABLE V

| Composition | I | | II | | III | |
|---|---|---|---|---|---|---|
| Temp. °C. | 420 | 500 | 420 | 500 | 420 | 500 |
| % HC Yield (C) | 100 | 99 | 99 | 100 | 11 | 12 |
| % HC Sel. (C) | | | | | | |
| $C_1$ | 6 | 1 | 15 | 27 | 7 | 85 |
| $C_2$ | 2 | 4 | 0 | 0 | 0 | 2 |
| $C_3$ | 12 | 24 | 17 | 18 | 4 | 4 |
| $C_4$ | 14 | 17 | 26 | 29 | 2 | 2 |
| $C_{5+}$ | 59 | 17 | 41 | 21 | 87 | 7 |
| Aromatic | 7 | 19 | 1 | 3 | 0 | 0 |

Thus, it is evident that the preparation of crystalline ferroborosilicates without chelate is very unpredictable since relatively inactive amorphous catalysts are often obtained.

Compositions IV-VII in Table VI below are prepared essentially as described in Example 1 utilizing the 8HQS chelate. All the compositions are crystalline and are tested in the H+ form at 6 psig and a feed rate of 1.5 g DME/g.

TABLE VI

| | IV | | V | | VI | | VII | |
|---|---|---|---|---|---|---|---|---|
| Catalyst | | | | | | | | |
| Temp. °C. | 420 | 500 | 420 | 500 | 520 | 500 | 420 | 500 |
| % HC Yield (C) | 100 | 20 | 100 | 100 | 100 | 99 | 100 | 99 |
| % HC Sel. (C) | | | | | | | | |
| $C_1$ | 9 | 29 | 9 | 15 | 5 | 9 | 7 | 9 |
| $C_2$ | 0 | 4 | 0 | 8 | 0 | 6 | 2 | 4 |
| $C_3$ | 10 | {16} | 8 | 10 | 8 | 10 | 25 | 6 |
| $C_4$ | 25 | | 24 | 29 | 24 | 25 | 19 | 14 |
| $C_{5+}$ | 47 | 50 | 55 | 37 | 54 | 38 | 38 | 37 |
| Aromatic % | 9 | 1 | 4 | 1 | 9 | 12 | 8 | 30 |
| Aromatic Sel. (C) | | | | | | | | |
| $C_6$ | 4 | 0 | 1 | 6 | 2 | 1 | 3 | 2 |
| $C_7$ | 8 | 19 | 11 | 24 | 6 | 10 | 10 | 9 |
| $C_8$ | 53 | 55 | 39 | 49 | 40 | 44 | 43 | 39 |
| $C_9$ | 29 | 27 | 32 | 16 | 40 | 36 | 34 | 38 |
| $C_{10}$ | 6 | 0 | 17 | 4 | 12 | 9 | 9 | 12 |

Amorphous material was detected in composition IV by X-ray diffraction. Test data at 420° C. for all four compositions are nearly equivalent, but composition VII gave abnormally high aromatic selectivity at 500° C. Composition VII has a pink coloration which may be due to precipitated $Fe_2O_3$ (red). The other compositions are nearly colorless. To improve the reproducibility of catalyst synthesis the synthesis procedure in Example 1 was improved and is described in Example 4.

EXAMPLE 4

I. Preparation of Ferroborosilicate-Reflux Method

A. Preparation of Precipitation Solutions

1. Sodium Silicate (Basic Solution)

276 grams of 50 wt % NaOH solution were added to 3000 ml of deionized water and brought to reflux. 400 grams of fumed silica were added and heated until dissolution occurred.

2. Precipitant Solution (Acidic Solution)

96 grams of concentrated $H_2SO_4$ were added to 1800 ml of deionized water. 424 grams of NaCl, 164 grams of tetrapropylammonium bromide and 44 grams of boric acid were added to the $H_2SO_4$ solution.

3. Iron Chelate Solution 42 grams of 50 wt % NaOH solution were added to 1400 ml of deionized water, 64 grams of 8-hydroxyquinoline-5-sulfonic acid were dissolved in the NaOH solution and then 30 grams of $FeCl_3.6H_2O$ were added to the solution.

B. Precipitation and Crystallization

The acidic solution ($A_2$) was added at a rate of 4 ml/min. to the rapidly stirred basic solution ($A_1$). After all of the acidic solution ($A_2$) was added and gelation was completed, the iron chelate solution ($A_3$) was slowly added. The pH of the solution was then adjusted to 8.5 with either $H_2SO_4$ or NaOH. The gelatinous solution was homogenized and transferred to a polypropylene flask and heated at 120° C. for 14 days. After this period, the solid was washed by repetitive decantation with deionized water. The solid was then collected by filtration and dried at 110° C. for 16 hours. cl II. $Na^+$-Ferroborosilicate The dried solid from step IB was calcined in air by raising the temperature 50° C. every 30 minutes to 540° C. and maintained at this temperature for 16 hours.

III. $NH^+_4$ or H+ Ferroborosilicate 50 grams of Na-Ferroborosilicate (II) were added to a solution of 25 grams $NH_4Cl$ dissolved in 400 ml deionized water and refluxed for 16 hours. The solution was then decanted and additional solution containing 25 grams $NH_4Cl$ dissolved in 400 ml deionized water were added. After 4 hours of reflux the solid was washed by repetitive decantation and isolated by filtration. Drying at 110° C. overnight yields $NH_4^+$-Ferroborosilicate. If the H+-Ferro Borosilicate is desired, the $NH_4^+$ form is calcined at 540° C. for 4 hours.

IV. $Pd^{2+}$-Ferroborosilicate

A. Ion Exchange

A 20 gram sample of either $Na^{30}$ (II) or $NH_4^+$ (III) Ferroborosilicate was added to a solution containing 0.6 gram $Pd(NH_3)_4Cl_2$ dissolved in deionized water. After being stirred at ambient temperature for 16 hours, the liquid was decanted and another 0.6 gram $Pd(NH_3)_4Cl_2$ dissolved in 400 ml deionized water was added. After being stirred at ambient temperature for 4 hours, the solid was washed with deionized water by repeated decantation. The solid was collected by filtration and dried at 110° C. overnight.

B. Catalyst Pretreatment

Before charging the Pd-Ferroborosilicate, the preferred pretreatment was to calcine 25 grams of IV in air at 540° C. for 4 hours and then cool it to ambient temperature. The calcined solid was treated with 5% hydrogen in nitrogen at a temperature program of 1° C./minute to 350° C. and held for 1 hour. After being cooled to ambient temperature in 5% hydrogen, part of the composition was charged to the reactor.

EXAMPLE 5

I. Preparation of Ferroborosilicate-Autoclave Method

A. Preparation of Solutions

1. Sodium Silicate 100 grams Cab-o-sil M-5 and 69 grams NaOH (50 wt %) were dissolved in 750 ml deionized water.

2. Quaternary Ion/Boron 11 grams of $H_3BO_3$ and 82.5 grams tetrapropylammonium bromide were dissolved in 500 ml deionized water.

3. Chelate 10.6 grams NaOH (50 wt %) and 16.4 grams 8-hydroxy-quinoline-5-sulfonic acid were dissolved in 400 ml water.

4. Iron 10.8 grams ferrous ammonium sulfate were dissolved in 100 ml water.

B. Solution Mixing and Crystallization

The chelate solution (A3) was added to sodium silicate (A1) with rapid stirring. The iron solution (A4) was added to quaternary ion / boron solution (A2), and this mixture was then added to the chelate/sodium silicate solution. During the addition, the solution turned black. After stirring at ambient temperature overnight, the solution was heated to 170° C. for 7 days without stirring. After 7 days, the solid was washed by successive decantations with deionized water and collected by filtration. The solid was dried at 110° C. overnight.

EXAMPLE 6

This example compares the palladium ferroborosilicates of the present invention (composition 1) with the prior art compositions (A, B, and C) that contain iron, palladium or both metals on silica. All of the compositions were prepared in accordance with Example 4, and all runs were conducted at 735 psig (5169 kPa) in a 310 stainless steel tubular reactor at an actual hourly space velocity of 80.

TABLE VII

SYNGAS REACTIONS
COMPARISON OF SUPPORTED IRON AND/OR PALLADIUM
CATALYST WITH PALLADIUM FERROBOROSILICATE (1)

| Catalyst | A Fe/silica | | B Pd—Fe/silica | | C Pd/silica | | 1 Pd—$SiO_2/B_2O_3$/FeO$_x$ | |
|---|---|---|---|---|---|---|---|---|
| % Fe | 1.3 | | 1.4 | | — | | 1.2 | |
| % Pd | — | | 1.5 | | 1.4 | | 2.0 | |
| Temp. °C. | 350 | 400 | 350 | 400 | 350 | 400 | 350 | 400 |
| HC Yield, % (3) | 12 | 34 | 33 | 37 | 1 | 3 | 7 | 25 |
| HC Sel., % (3) | | | | | | | | |
| $C_1$ | 42 | 51 | 53 | 49 | — | — | 22 | 44 |
| $C_2$ | 20 | 21 | 25 | 25 | — | — | 39 | 46 |
| $C_3$ | 19 | 15 | 17 | 18 | — | — | 28 | 8 |
| $C_4$ | 9 | 5 | 5 | 6 | — | — | 11 | 2 |
| $C_{5+}$ & Ar | 11 | 8 | 0 | 2 | — | — | 0 | 0 |
| $CO_2$ Yield, % (3) | 3 | 25 | 29 | 32 | 1 | 2 | 9 | 23 |

(1) $H_2$/CO = 1, 735 psig, Actual Hourly Space Velocity = 80
(2) Catalysts A, B, C prepared by imprgnation of salts on Grace #57 silica gel, hydrogen treated, 1 - prepared as in Example 1.

The results in Table VII show that iron must be present for the composition to possess catalytic activity for synthesis gas conversion. Further, while compositions A and B exhibit catalytic activity for synthesis gas conversion, they do not show the higher ethane selectivity manifested by a crystalline composition which contains palladium, iron and boron.

EXAMPLE 7

This example compares the catalytic properties of the silicate compositions of the present invention (composition 1) and the prior art compositions D, E, F, and G which are outside the scope of this invention and the effects of palladium ion-exchange on each composition. All of the compositions were prepared in accordance with Example 4, with a hydgrogen treatment of 500° C. and all runs were conducted at 735 psig (5169 kPa) in a 310 stainless steel tubular reactor at an actual hourly space velocity of 80.

TABLE VIII

SYNGAS REACTIONS (1,2)
ACTIVITY OF CRYSTALLINE SILICATES AND
THE EFFECT OF PALLADIUM

| Catalyst | D | | 1 | F | G |
|---|---|---|---|---|---|
| Silicate (2) | $SiO_2/B_2O_3$ | | $SiO_2/B_2O_3$/FeO$_x$ | $SiO_2$/FeO$_x$ | |
| Ion Form (3) | H+ | Pd$^{2+}$ | H+ Pd$^{2+}$ | H+ | Pd$^{2+}$ |
| HC Yield, % (4) | N.A. | 2 | 1 25 | 1 | 20 |
| HC Sel., % (4) | | | | | |
| $C_1$ | — | — | — 44 | — | 68 |
| $C_2$ | — | — | — 46 | — | 22 |
| $C_3$ | — | — | — 8 | — | 7 |
| $C_4$ | — | — | — 2 | — | 2 |
| $C_{5+}$ & Ar | — | — | — 0 | — | 0 |
| $CO_2$ Yield, % (4) | N.A. | 0 | 0 23 | 1 | 18 |

(1) 400° C., $H_2$/CO = 1, 735 psig, Actual Hourly Space Velocity = 80
(2) All have ZSM-5 type X-ray diffraction pattern and contain about 100 ppm Al.
(3) Ion exchanged, $H_2$ treated at 500° C.
(4) Based on carbon.

The results show that only crystalline compositions (1 and G) which contain both iron and palladium are active for the conversion of synthesis gas to low molecular weight hydrocarbons. This is illustrated by comparing compositions 1 and G with the results of compositions D, E and F. Further, a comparison of compositions 1 and G indicate that the presence of boron increases the ethane selectivity of the composition for synthesis gas conversion.

EXAMPLE 8

This example compares the catalytic properties of the compositions (2, 3, 4, 5 and 6) of the present invention and the effect of sodium content on their catalytic activity. All of the compositions were prepared in accordance with Example 4 except that the hydrogen treatment is as shown in Table IX, and all runs were conducted at 735 psig (5169 kPa) in a 310 stainless steel tubular reactor at an actual hourly space velocity of 80.

TABLE IX

SYNGAS REACTIONS
PALLADIUM-EXCHANGED FERROBOROSILICATES (1,2)

| Catalyst | 2 | 3 | 4 | 5 | 6 |
|---|---|---|---|---|---|
| Anal. (wt. %) | | | | | |
| Pd | 2.3 | 1.8 | 2.3 | 2.1 | 2.2 |
| Fe | 1.5 | 1.6 | 1.4 | 1.1 | 1.1 |
| Na | $140 \times 10^{-4}$ | 0.4 | 0.4 | $38 \times 10^{-4}$ | $59 \times 10^{-4}$ |
| $H_2$ Treatment (3) | 3 | 1 | 2 | 1 | 1 |
| HC Yield, % (4) | 19 | 2 | 1 | 22 | 20 |
| HC Sel., % (4) | | | | | |
| $C_1$ | 30 | — | — | 29 | 23 |
| $C_2$ | 64 | — | — | 61 | 65 |
| $C_3$ | 6 | — | — | 7 | 10 |
| $C_4$ | 1 | — | — | 2 | 3 |
| $C_{5+}$ | 0 | — | — | 0 | 0 |
| Ar | 0 | — | — | 0 | 0 |
| $CO_2$ Yield, % (4) | 17 | 2 | 1 | 20 | 17 |

(1) 400° C., $H_2$/CO = 1, 735 psig, Actual Space Velocity = 80 hr$^{-1}$.
(2) $Pd^{2+}$ exchange of $Na^+$—$SiO_2/B_2O_3/FeO_x$.
(3) $H_2$ treatment 1 = 1°/min. 350° C.
2 = 1°/min. 500° C.
3 = uncontrolled to 500° C.
(4) Based on carbon.

The data show that the method of preparing the compositions of the present invention is critical to both activity and selectivity for the conversion of synthesis gas. Comparison of compositions 3 and 4 with compositions 2, 5 and 6 indicate that the sodium content must be minimized to obtain a composition that is catalytically active. Sodium contamination can be substantially avoided by ammonium exhanging the sodium ferroborosilicate prior to palladium exchange.

EXAMPLE 9

This example compares the selectivity for ethane of compositions (1 and 7) of the present invention and the effects of hydrogen treatment temperature. Compositions 1 and 7 are from the same batch which was prepared in accordance with Example 4. Samples from this batch were hydrogen treated as shown in Table X to prepare compositions 1 and 7. All runs were conducted at 735 psig (5169 kPa) in a 310 stainless steel tubular reactor at an actual hourly space velocity of 80.

TABLE X

SYNGAS REACTIONS
EFFECT OF HYDROGEN TREATEMNT TEMPERATURE
ON Pd—EXCHANGED FERROBOROSILICATE (1,2)

| Catalyst | 7 | 1 |
|---|---|---|
| Hydrogen treatment, °C. (3) | 350 | 500 |
| HC Yield, % (4) | 22 | 25 |
| HC Sel., % (4) | | |
| $C_1$ | 29 | 44 |
| $C_2$ | 62 | 46 |
| $C_3$ | 7 | 8 |
| $C_4$ | 2 | 2 |
| $C_{5+}$ | 0 | 0 |
| Ar | 0 | 0 |

TABLE X-continued

SYNGAS REACTIONS
EFFECT OF HYDROGEN TREATEMNT TEMPERATURE
ON Pd—EXCHANGED FERROBOROSILICATE (1,2)

| $CO_2$ Yield, % (4) | 19 | 23 |
|---|---|---|

(1) 400° C., $H_2$/CO = 1, 735 psig, Actual Space Velocity = 80 hr$^{-1}$.
(2) $NH_4^+$—$SiO_2/B_2O_3/FeO_x$, Ambient Pd exchange, air 540° C.
(3) 1°/min. heating rate.
(4) Based on carbon.

These data show that hydrogen treatment temperature during the preparation of the compositions is critical for ethane selectivity. A comparison of composition (7) which was heat treated to a temperature of 350° C. has a higher ethane selectivity than composition (1) which was heat treated to a temperature of 500° C.

EXAMPLE 10

This example compares the effects of hydrochloric acid extraction on the ferroborosilicate compositions (H, I, 8 and 9) in terms of the effect on catalytic activity for synthesis gas conversion and ethane selectivity. All of the compositions were prepared in accordance with Example 4, and all runs were conducted at 735 psig (5169 kPa) in a 310 stainless steel tubular reactor at an actual hourly space velocity of 80.

TABLE XI

SYNGAS REACTIONS
FERROBOROSILICATE-REFLUX METHOD
THE EFFECT OF HCl EXTRACTION (1)

| Catalyst | H | I | 8 | 9 |
|---|---|---|---|---|
| Ion Form | $H^+$ | | $Pd^{2+}$ | |
| Extracted (2) | no | yes | no | yes |
| % Fe | 1.7 | 0.9 | 1.1 | 0.9 |
| % B | 0.1 | 0.1 | 0.1 | 0.1 |
| % Pd | — | — | 2.0 | 1.2 |
| HC Yield, % (3) | 2 | 1 | 22 | 20 |
| HC Sel., % (3) | | | | |
| $C_1$ | — | — | 31 | 19 |
| $C_2$ | — | — | 55 | 63 |
| $C_3$ | — | — | 12 | 8 |
| $C_4$ | — | — | 3 | 3 |
| $C_{5+}$ & Ar | — | — | 0 | 7 |
| $CO_2$ Yield, % (3) | 2 | 1 | 19 | 17 |

(1) 400° C., $H_2$/CO = 1, 735 psig, Actual Hourly Space Velocity = 80.
(2) 1N HCl, 60° C., 24 hrs. before Pd—exchange.
(3) Based on carbon.

The data show the desirability of extracting the compositions with hydrochloric acid to enhance ethane selectivity for synthesis gas conversion. Composition 9 shows an increased selectivity for ethane over composition 8 which is believed to be related to the lower iron content of the composition (9).

EXAMPLE 11

This example compares the effect of hydrochloric acid extraction on ferroborosilicates prepared by the Autoclave Method (Example 5). Compositions 10 and 11 contain palladium while J does not. All runs were conducted at 735 psig (5169 kPa) in a 310 stainless steel tubular ractor at an actual hourly space velocity of 80.

TABLE XII

SYNGAS REACTIONS
FERROBOROSILICATE-AUTOCLAVE METHOD (1)

| Catalyst | J | 10 | 11 |
|---|---|---|---|
| Ion Form | | | |
| Extracted (2) | no | no | yes |
| % Fe | 1.5 | 1.5 | 1.2 |
| % B | 0.2 | 0.2 | 0.1 |

TABLE XII-continued

SYNGAS REACTIONS
FERROBOROSILICATE-AUTOCLAVE METHOD (1)

| % Pd | — | 1.8 | 1.0 |
|---|---|---|---|
| HC Yield, % (3) | 5 | 45 | 32 |
| HC Sel., % (3) | | | |
| $C_1$ | 62 | 41 | 50 |
| $C_2$ | 27 | 19 | 44 |
| $C_3$ | 11 | 14 | 6 |
| $C_4$ | 0 | 7 | 1 |
| $C_{5+}$ & Ar | 0 | 19 | 0 |
| $CO_2$ Yield, % (3) | 3 | 37 | 24 |

(1) 400° C., $H_2/CO$ = 1, 735 psig, Actual Hourly Space Velocity = 80.
(2) 1N HCl, 60° C., 24 hrs. before Pd—exchange.
(3) Based on carbon.

The data show the importance of extracting the compositions of the present invention to enhance ethane selectivity for the conversion of synthesis gas to low molecular weight hydrocarbons. (Compare composition 10 to composition 11). Composition J without palladium shows low activity, probably due to some amorphous iron present.

EXAMPLE 12

This example shows the effect of iron content of palladium ferroborosilicates on catalytic activity for synthesis gas conversion. All of the compositions were prepared in accordance with Example 4, and all runs were conducted at 735 psig (5169 kPa) in a 310 stainless steel tubular reactor at an actual hourly space velocity of 80.

TABLE XII

SYNGAS REACTIONS THE EFFECT OF IRON CONTENT OF THE CATALYTIC PROPERTIES OF PALLADIUM FERROBOROSILICATES (1)

| Catalyst | 12 | | 13 | | 14 | |
|---|---|---|---|---|---|---|
| Wt. % Fe | 0.1 | | 0.5 | | 1.0 | |
| B | 0.3 | | 0.3 | | 0.1 | |
| Molar Ratio | | | | | | |
| Pd/Fe | N.A. | | 1.8 | | 1.0 | |
| Fe/B | 0.06 | | 0.3 | | 1.9 | |
| Time on Stream, Hrs. | 3  21 | 4  [4]  (3) | 23  [23]  (3) | | 4 | 23 |
| HC Yield, % (2) | 3  3 | 12  [12] | 11  [11] | | 21 | 20 |
| HC Sel., % (2) | | | | | | |
| $C_1$ | —  — | 19  [22] | 28  [30] | | 29 | 41 |
| $C_2$ | —  — | 77  [75] | 69  [67] | | 61 | 22 |
| $C_3$ | —  — | 3  [3] | 3  [3] | | 9 | 23 |
| $C_4$ | —  — | 0  [0] | 0  [0] | | 1 | 6 |
| $C_{5+}$ & Ar | —  — | 0  [0] | 0  [0] | | 0 | 8 |
| $CO_2$ Yield, % (2) | 2  2 | 10  [11] | 9  [10] | | 18 | 17 |

(1) $H_2/CO$ = 1, 735 psig, 400° C., Actual Hourly Space Velocity = 80.
(2) Based on carbon.
(3) Values obtained in a repeat test.

The data show that composition 13 with an iron content of 0.5 wt % gives higher ethane selectivity than composition 14 containing 1.0 wt % iron. Composition 12 containing 0.1 wt % iron gave little activity at these conditions.

EXAMPLE 13

This example compares a physical mixture of Cu-Zn/palladium ferroborosilicate to palladium ferroborosilicate at various iron levels. All catalysts are of the present invention for the conversion of synthesis gas to low molecular weight hydrocarbons. The physical mixture catalyst was prepared by mixing a methanol synthesis catalyst (Cu - Zn oxide known as "C18HC" from United Catalyst Inc.) with the palladium ferroborosilicate which was prepared in accordance with Example 4. 3 ml (3.5 grams) of the Cu-Zn catalyst were added to 6 ml (2.7 grams) of palladium ferroborosilicate and were mixed before being charged to the reactor. All runs were conducted at 735 psig (5169 kPa) in a 310 stainless steel tubular reactor at an actual hourly space velocity of 80.

TABLE XIV

SYNGAS REACTIONS THE EFFECT OF PHYSICAL MIXTURES OF Cu—Zn OXIDE AND PALLADIUM FERROBOROSILICATE

| $Pd—SiO_2/B_2O_3/FeO_x$ | | Cu—Zn oxide $Pd—SiO_2/B_2O_3/FeO_x$ | |
|---|---|---|---|
| Fe, wt % | HC Yield, % | Fe, wt % | HC Yield, % |
| 0 | 3 | 0 | 10 |
| 0.1 | 3 | 0.1 | 13 |
| 0.4 | 14 | 0.4 | 22 |
| 1.0 | 22 | 1.0 | 29 |

The data show at 0%, 0.1%, 0.4% and 1.0% iron respectively, that the hydrocarbon yield of the physical mixture was higher than with palladium ferroborosilicate alone.

EXAMPLE 14

This example compares the stability of the physical mixture of Cu-Zn oxide/palladium ferroborosilicate of the present invention at various iron levels for the conversion of synthesis gas to low molecular weight hydrocarbons. The physical mixtures were prepared by mixing a methanol synthesis catalyst (Cu-Zn oxide known as "C18HC" from United Catalyst Inc.) with the palladium ferroborosilicate which was prepared in accordance with Example 4. 3 ml (3.5 grams) of the Cu-Zn catalyst were added to 6 ml (2.7 grams) of palladium ferroborosilicate and were mixed before being charged to the reactor. All runs were conducted at 735 psig (5169 kPa) in a 310 stainless steel tubular reactor at an actual hourly space velocity of 80.

TABLE XV

SYNGAS REACTIONS STABILITY WITH Cu—Zn/Pd FERROBOROSILICATE AT VARIOUS IRON LEVELS

| Time on Stream, hrs | $C_2$ Sel., % | Time on Stream, hrs | $C_2$ Sel., % |
|---|---|---|---|
| 0% Fe | | 0.1% Fe | |
| 3 | 24 | 4 | 47 |
| 25 | 21 | 23 | 51 |
| 29 | 24 | 28 | 51 |
| 0.4% Fe | | 47 | 49 |
| 4 | 68 | 71 | 45 |
| 22 | 68 | 76 | 36 |
| 27 | 68 | 1.0% Fe | |
| 46 | 63 | 4 | 54 |
| 51 | 63 | 23 | 20 |
| 70 | 59 | | |
| 75 | 60 | | |
| 94 | 53 | | |
| 100 | 52 | | |

The data show the physical mixture composition having 0.4% iron weight content has the highest ethane selectivity and stability of all the mixtures.

Obviously, other modifications and variations of the present invention are possible in the light of the above teachings. It is, therefore, to be understood that changes may be made in the particular embodiments of this invention which are within the full intended scope of the invention as defined by the appended claims.

What is claimed is:

1. A method for the conversion of synthesis gas comprising:

contacting synthesis gas which comprises hydrogen and carbon monoxide with a catalytically effective amount of a crystalline ferroborosilicate composition, under conversion conditions effective to provide ethane selectivity of at least 40%, said borosilicate composition represented in terms of mole ratios as follows: (0.2 to 15) $M_{2/m}O$:(0.2 to 10) $Z_2O_3$: (5 to 1000) $SiO_2$: $Fe_{2/n}O$: (0 to 2000) $H_2O$ wherein M comprises a cation of a quaternary ammonium, metal, ammonium, hydrogen and mixtures thereof, m is the valence of said cation, n is the valence of the iron cation, and Z is boron, said composition containing ion-exchanged palladium or palladium impregnated onto said composition.

2. A method according to claim 1 wherein the composition is substantially sodium free.

3. A method for the conversion of synthesis gas comprising:

contacting synthesis gas which comprises hydrogen and carbon monoxide with a catalytically effective amount of a crystalline ferroborosilicate composition, under conversion conditions effective to provide ethane selectivity of at least 40%, said ferroborosilicate composition being prepared by a method which comprises:

(a) heating a reaction mixture capable of forming a crystalline product, said reaction mixture comprising quaternary ammonium compound, a source of boron, an oxide of silicon, an alkali metal hydroxide, a source of iron oxide and water;

(b) recovering the crystalline product;

(c) heating the recovered crystalline product in an inert atmosphere or air at 200°-900° C. for 1 to 60 hours, and (d) ion-exchanging the heat treated crystalline product with a palladium salt solution to provide a palladiumm ion-exchanged crystalline ferroborosilicate.

4. A method according to claim 3 wherein said reaction mixture additionally contains a chelating agent.

5. A method according to claim 4 wherein said chelating agent is 8-hydroxyquinoline-5-sulfonic acid.

6. A method according to claim 3 wherein said quaternary ammonium compound is tetrapropylammonium bromide, said source of aluminum oxide is aluminum chloride or aluminum hydroxide, said source of boron oxide is boric acid, said oxide of silicon is fumed silica, said alkali metal hydroxide is sodium hydroxide and said source of iron oxide is ferrous chloride, ferric chloride or mixtures thereof.

7. A method according to claim 3, including the following additional step:

(e) calcining the palladium ion-exchanged crystalline ferroborosilicate in air at a temmperature of about 300° C. to about 600° C. for at least 4 hours.

8. A method according to claim 7, including the following additional steps:

(f) heating the calcined palladium ferroborosilicate in the presence of hydrogen from ambient temperature to an elevated temperature of about 300° C. to about 400° C. at a rate of temperature increase of about 0.5 to about 2.0° C. per minute;

(g) maintaining said borosilicate at said temperature for about 0.75 to about 1.25 hour; and (h) cooling said borosilicate to ambient temperature in the presence of hydrogen.

9. A method according to claim 3, including the following additional step:

(i) mixing said siicate with a methanol synthesis catalyst.

10. A method according to claim 9 wherein said methanol catalyst comprises chromium oxide-zinc oxide or copper oxide-zinc oxide.